(12) United States Patent
Ito

(10) Patent No.: US 9,575,400 B2
(45) Date of Patent: Feb. 21, 2017

(54) IMAGE DISPLAY APPARATUS, METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Motohisa Ito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 14/556,665

(22) Filed: Dec. 1, 2014

(65) Prior Publication Data

US 2015/0177606 A1    Jun. 25, 2015

(30) Foreign Application Priority Data

Dec. 19, 2013  (JP) ................................. 2013-263021

(51) Int. Cl.
 *G03B 21/20*  (2006.01)
 *G03B 21/13*  (2006.01)
 *G03B 37/04*  (2006.01)
 *G03B 21/00*  (2006.01)

(52) U.S. Cl.
 CPC ........... *G03B 21/2053* (2013.01); *G03B 21/13* (2013.01); *G03B 37/04* (2013.01); *G03B 21/005* (2013.01); *G03B 21/2013* (2013.01)

(58) Field of Classification Search
 CPC ..... G03B 21/13; G03B 21/2053; G03B 37/04; G03B 21/005; G03B 21/2013
 See application file for complete search history.

(56) References Cited

U.S. PATENT DOCUMENTS

| | | | |
|---|---|---|---|
| 8,531,444 B2 | 9/2013 | Ito | |
| 2009/0284555 A1* | 11/2009 | Webb | G09G 3/002 345/690 |
| 2010/0013856 A1* | 1/2010 | Abe | G09G 5/363 345/629 |

FOREIGN PATENT DOCUMENTS

| | | |
|---|---|---|
| JP | 06-018806 A | 1/1994 |
| JP | 2012-089454 A | 5/2012 |
| JP | 2013-076837 A | 4/2013 |
| JP | 2013-114980 A | 6/2013 |

* cited by examiner

*Primary Examiner* — Sultan Chowdhury
*Assistant Examiner* — Magda Cruz
(74) *Attorney, Agent, or Firm* — Fitzpatrick, Cella, Harper & Scinto

(57) ABSTRACT

An image display apparatus projects a first image by using a light source constituted by a plurality of point light sources, performs lighting in a unit of lighting formed from at least one point light source of the plurality of point light sources, and controls, in the unit of lighting, lighting in an overlapped area between the first image and a second image projected from another image display apparatus so as to equalize luminances in the overlapped area and a non-overlapped area when the second image is a solid black frame.

12 Claims, 8 Drawing Sheets

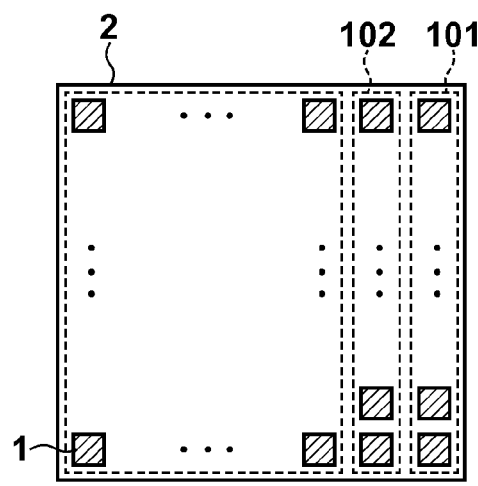 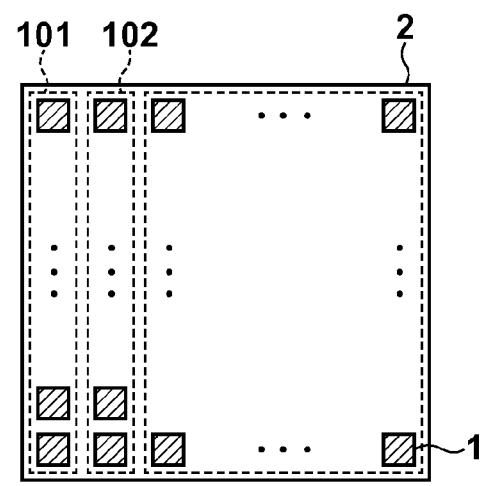
F I G. 3A    F I G. 3B

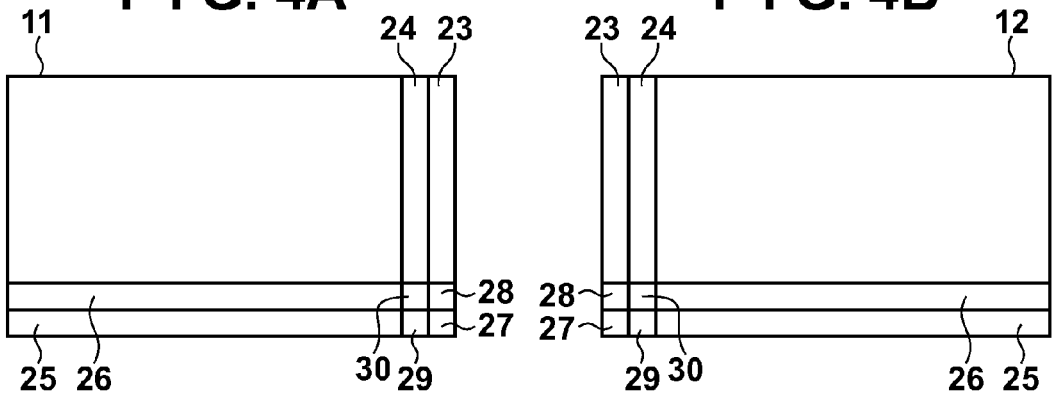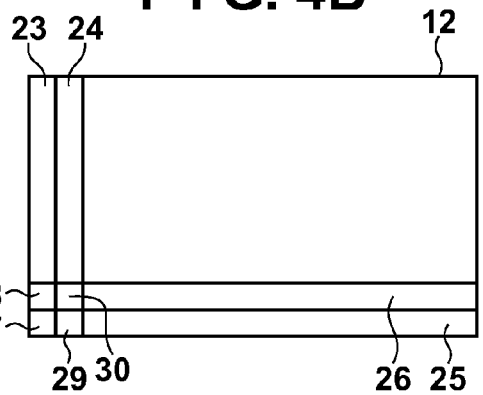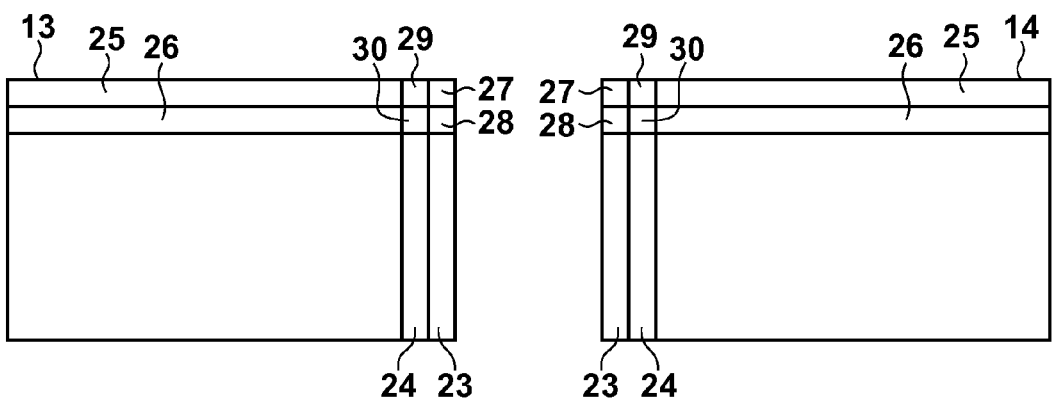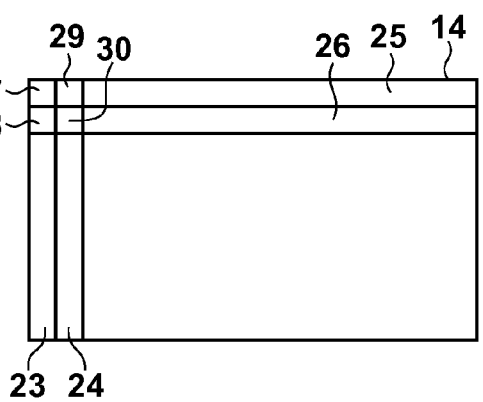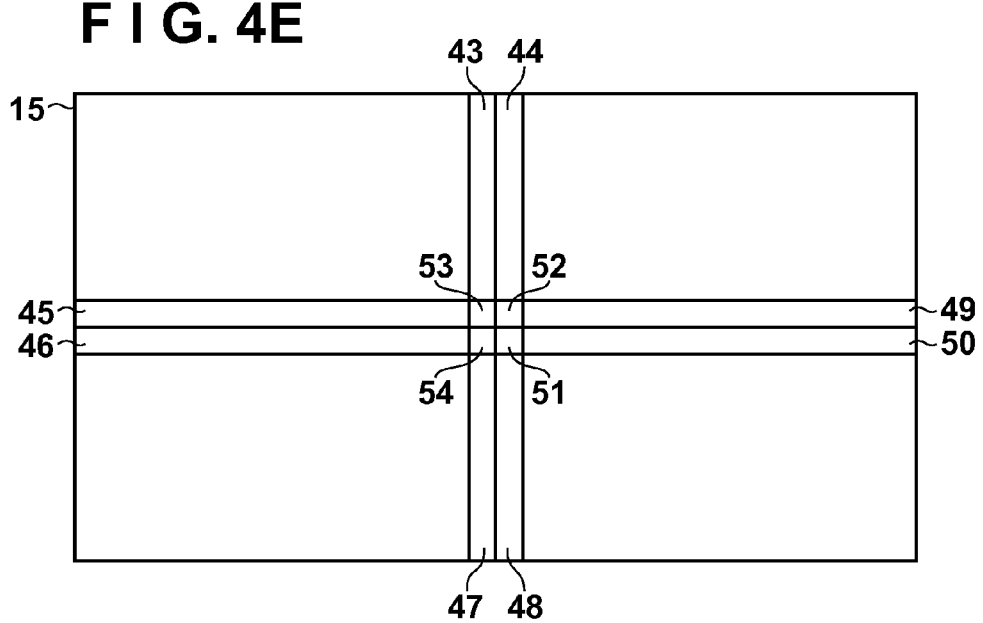

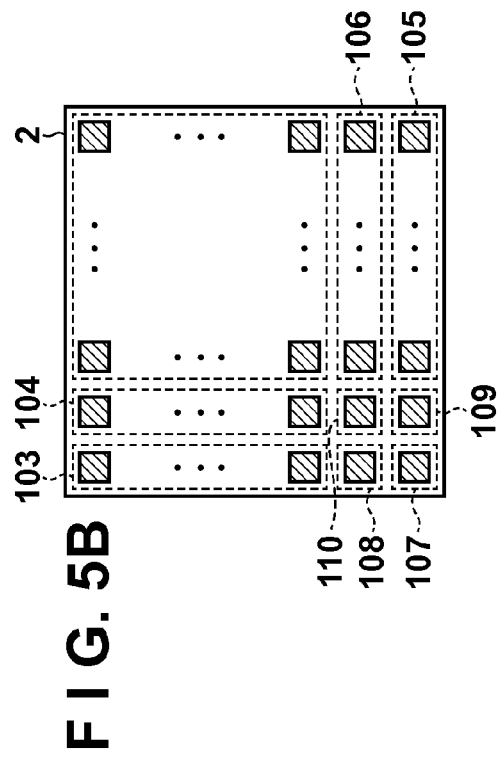
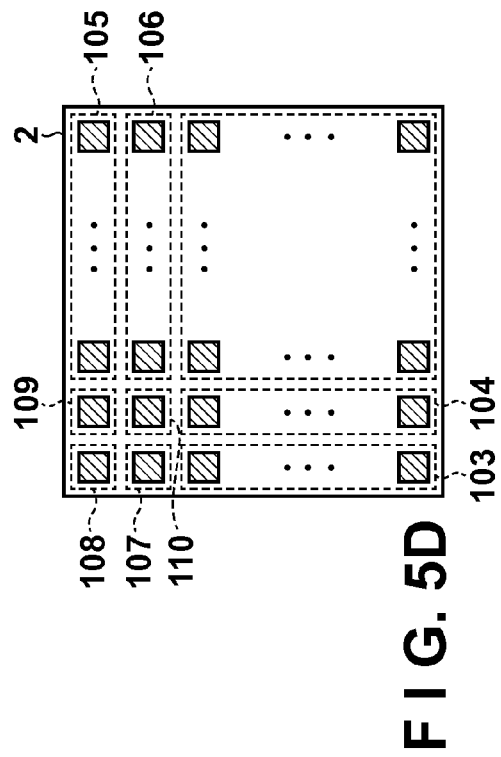
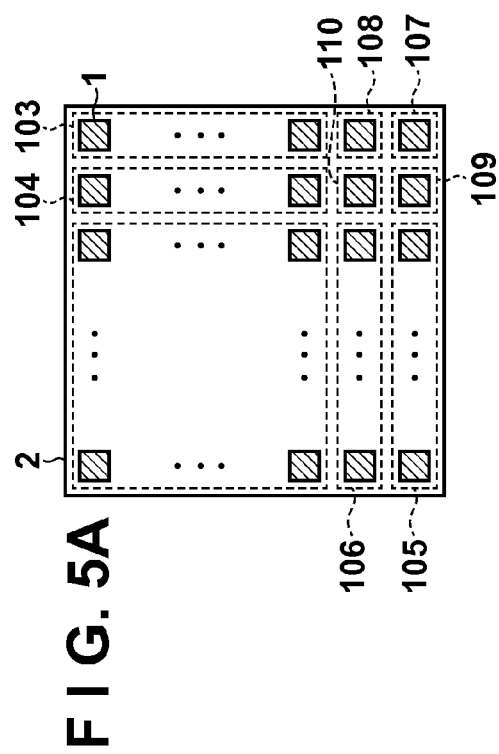
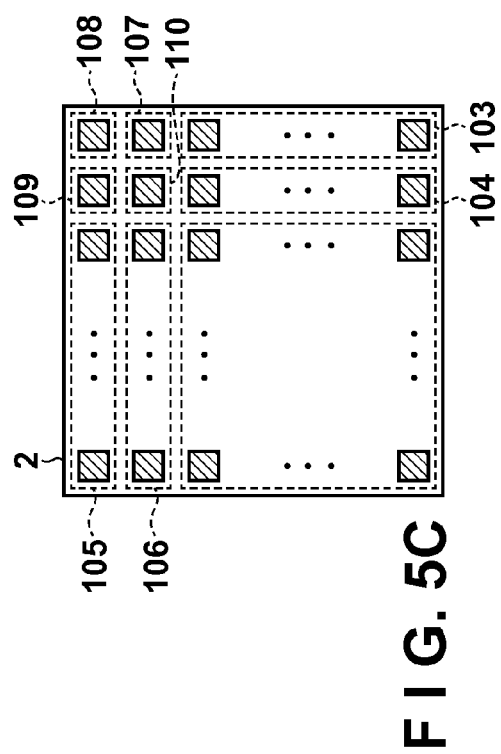
FIG. 5A
FIG. 5B
FIG. 5C
FIG. 5D

F I G. 8A
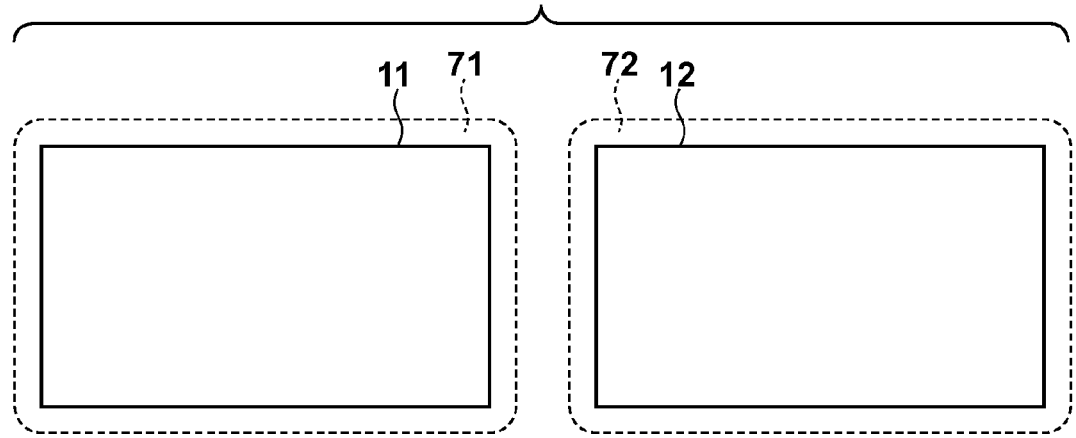
F I G. 8B
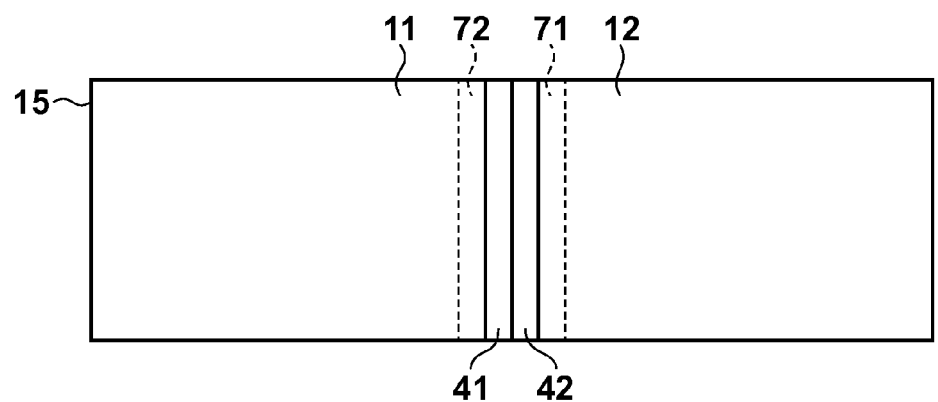

F I G. 9A
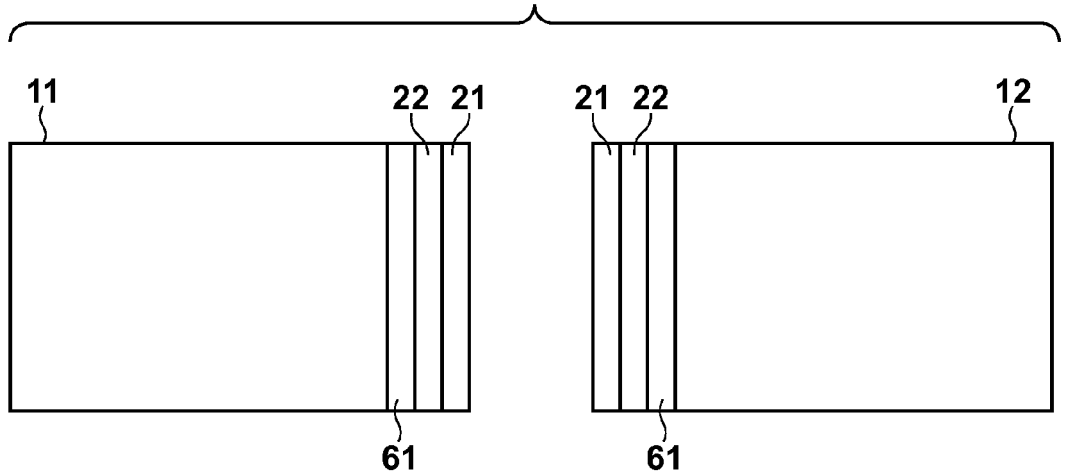
F I G. 9B
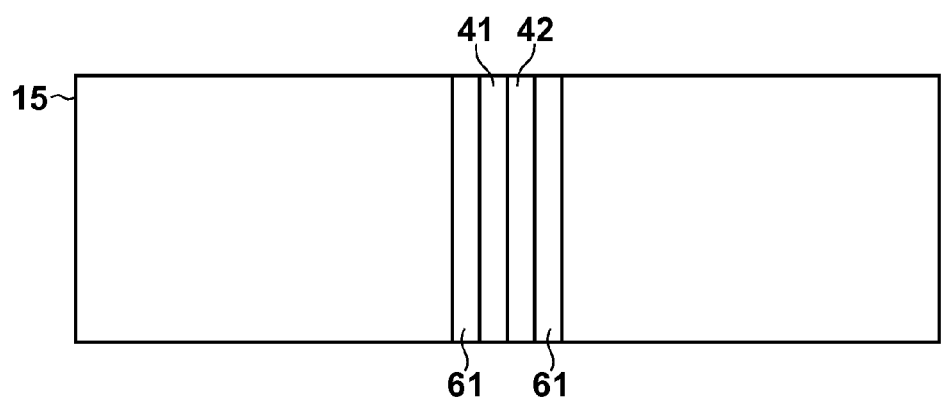
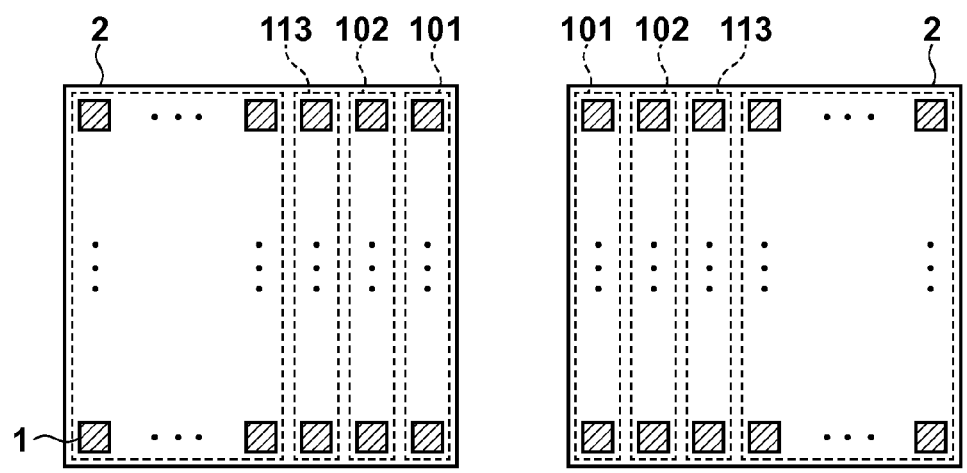
F I G. 10A     F I G. 10B

IMAGE DISPLAY APPARATUS, METHOD OF CONTROLLING THE SAME, AND NON-TRANSITORY COMPUTER-READABLE STORAGE MEDIUM

BACKGROUND OF THE INVENTION

Field of the Invention

The present invention relates to an image display apparatus which displays a larger projection image by combining a plurality of projection images, a method of controlling the same, and a non-transitory computer-readable storage medium.

Description of the Related Art

Recently, there have been widely used apparatuses which provide various kinds of information by using large image display apparatuses regardless of whether they are used outdoors or indoors. For example, many large image display apparatuses which provide various types of advertisements and environmental images exist in front of train stations and commercial districts. These large image display apparatuses include liquid crystal displays, plasma displays, and projection type image display apparatus (to be referred to as image display apparatuses hereinafter). When a screen size is 100 inches or more or the screen is not flat, in particular, a large image display apparatus is formed by using a multi-projection system which displays an image by combining a plurality of image display apparatuses. This is because a multi-projection system can easily display a large screen by combining a plurality of image display apparatuses, and can display images on a screen even if it is not flat.

A multi-projection system projects adjacent projection images while partially overlapping them so as to make the boundaries between the adjacent projection images inconspicuous. In this case, since a plurality of images overlap each other, overlapped areas where projection images overlap each other have a higher luminance than the remaining areas. There is known a method of suppressing the luminance signals of projection images in overlapped areas so as to make overlapped images have the same luminance after overlapping as that in areas other than the overlapped areas.

This method, however, cannot prevent a phenomenon called a misadjusted black level, in which black looks gray instead of black. A display element is designed to generate a projection image from an input image signal. Owing to this characteristic, even if a luminance signal is 0, that is, an input image is black, the image projected by the image display apparatus is not a black color equivalent to that of black body radiation. Assume that when the image display apparatus projects an image with a luminance signal of 0, that is, a black image, the luminance of the projection image is represented by black level (BL). In this case, since the luminance signal of the black image is 0, it is not possible to further suppress the luminance signal. Therefore, in an overlapped area where projection images from n image display apparatuses overlap each other, even if black is displayed, the black area has a luminance of n×BL. That is, misadjusted black level becomes prominent.

In addition, in a reflective liquid crystal display element, radiant light from a light source is reflected by members in the element, and the reflected light leaks outside the range of a projection image. For this reason, when constructing a multi-projection system by using image display apparatuses to which reflective liquid crystal display elements are applied, this leaked light leaks into the projection image area projected by another image display apparatus. This raises a problem that the luminance of the peripheral area of the overlapped area increases due to the influence of this leaked light. In addition, since the luminance of the peripheral area of the overlapped area increases, the misadjusted black level in the peripheral area of the overlapped area becomes prominent.

In consideration of such problems, it is possible to reduce the value of BL by controlling the light source of the image display apparatus and suppressing the light beam emitted by the light source. This can eventually reduce the misadjusted black level in the overlapped area. Furthermore, suppressing a light beam in a peripheral portion of a display element can reduce the light reflected by members in a reflective liquid crystal display element, thereby eventually suppressing an increase in luminance in the peripheral area of the overlapped area. Conventionally, there have been proposed techniques of controlling the light source of an image display apparatus. The technique disclosed in Japanese Patent Laid-Open No. 2012-89454 is a technique of controlling the light beams emitted from a solid-state light source array including a plurality of solid-state light sources at the duty ratio between an emission period and a non-emission period. In addition, Japanese Patent Laid-Open No. 2013-114980 discloses a technique concerning a light source apparatus designed to generate fluorescence by using excitation light emitted from two light sources. Japanese Patent Laid-Open No. 2013-76837 discloses a technique concerning a light source apparatus having a mechanism having a plurality of lenses fixed on the optical axis of light emitted from a light source. Japanese Patent Laid-Open No. 6-18806 discloses a technique of forming a light beam.

The technique disclosed in Japanese Patent Laid-Open No. 2012-89454 has a problem that if there is no emission period/non-emission period synchronization between image display apparatuses, projection images suffer from flickering and contrast inconsistency.

SUMMARY OF THE INVENTION

The present invention has been made to solve the above problems, and reduces the misadjusted black level in overlapped areas without causing any flickering or contrast inconsistency in projection images in a multi-projection system. In addition, even when using reflective liquid crystal display elements, the present invention suppresses increases in luminance and misadjusted black level in the peripheral areas of overlapped areas without causing any flickering or contrast inconsistency in projection images.

According to one aspect of the present invention, there is an image display apparatus comprising: a projection unit configured to project a first image by using a light source constituted by a plurality of point light sources; a lighting unit configured to perform lighting in a unit of lighting formed from at least one point light source of the plurality of point light sources; and a control unit configured to control, in the unit of lighting, lighting in an overlapped area between the first image and a second image projected from another image display apparatus so as to equalize luminances in the overlapped area and a non-overlapped area when the second image is a solid black frame.

Further features of the present invention will become apparent from the following description of exemplary embodiments (with reference to the attached drawings).

BRIEF DESCRIPTION OF THE DRAWINGS

FIGS. 3A and 3B are views for explaining how units of lighting are set in the first embodiment.

FIGS. 4A to 4E are views for explaining a multi-projection system according to the second embodiment.

FIGS. 5A to 5D are views for explaining how units of lighting are set in the second embodiment.

FIGS. 8A and 8B are views for explaining the influence of leaked light in a reflective liquid crystal display element.

FIGS. 9A and 9B are views for explaining a multi-projection system according to the fourth embodiment.

FIGS. 10A and 10B are views for explaining how units of lighting are set in the fourth embodiment.

DESCRIPTION OF THE EMBODIMENTS

Figure 1:
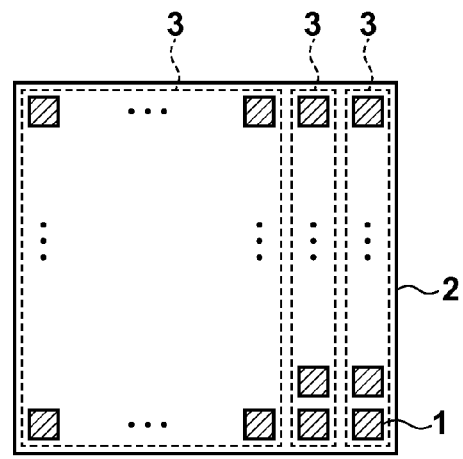
FIG. 1 is a view for explaining units of lighting according to an embodiment of the present invention.

The embodiments of the present invention will be described below with reference to the accompanying drawings. The details of the embodiments can be changed without departing from the spirit and scope of the present invention. Therefore, the embodiments are not limited to the contents described below. The embodiments described below may be implemented on hardware or by software, unless otherwise specified. In principle, the same reference numerals denote members having the same functions, and a repetitive description of them will be omitted.

Units of lighting in the embodiments of the present invention will be described first. FIG. 1 is a view for explaining units of lighting. In the embodiments, a light source 2 is constituted by a plurality of point light sources 1. In addition, a unit 3 of lighting is formed from one point light source 1 or a combination of a plurality of adjacent point light sources 1. The point light source 1 can be implemented by a light source satisfying all the following conditions:

1) capable of making a radiant light beam variable;
2) capable of making the rate of change of a radiant light beam follow a displayed image; and
3) capable of implementing a number of point light sources necessary to constitute the light source 2.

The point light source 1 can be implemented by, for example, an Light-Emitting Diode (LED), Organic Light-Emitting Diode (OLED), or semiconductor Laser Diode (LD), which satisfies these conditions. An LED or OLED used for the point light source 1 may be a white LED or white OLED which emits white light or a monochrome LED or monochrome OLED which emits each of the colors R, G, and B which are the three primary colors of light. Note that the point light sources 1 need not coincide with pixels of a projection image, and one point light source 1 may project light on a plurality of pixels. In addition, the projection area where one point light source 1 projects need not be an area constituted by the same number of pixels in the vertical and horizontal directions.

The unit 3 of lighting is a basic unit when the image display apparatus according to each embodiment executes control to make a radiant light beam from the light source 2 variable. Note that the unit 3 of lighting is an area logically set by the image display apparatus according to each embodiment when controlling the light beam emitted by the light source 2. Therefore, there are no physical boundaries, on the light source 2, which delimit the units 3 of lighting. The image display apparatus according to each embodiment sets a radiant light beam to each unit 3 of lighting. The image display apparatus according to each embodiment controls radiant light beams in the unit 3 of lighting by controlling radiant light beams from the point light sources 1 included in the unit 3 of lighting.

All the units 3 of lighting need not have the same shape or be rectangular. The shapes of the units 3 of lighting depend on the lighting control used by the image display apparatus according to this embodiment. For example, in constructing a multi-projection system, when executing lighting control only in overlapped areas, the shape of each unit 3 of lighting may be fixed. In contrast, when applying adaptive lighting control of adaptively executing lighting control for a projection image, the shape of each unit 3 of lighting can be adaptively changed in accordance with a projection image. Note that this embodiment does not depend on any adaptive lighting control technique. It is therefore possible to implement, by using a known technique, a means for controlling the shape of each unit 3 of lighting or the light beam emitted from each unit 3 of lighting based on a projection image. For example, it is possible to implement this means by using the lighting control technique incorporated in a commercially available liquid crystal display (LCD). The following will describe an example of constructing a multi-projection system by using a plurality of image display apparatuses according to each of the first to fifth embodiments.

First Embodiment

Figure 2A:
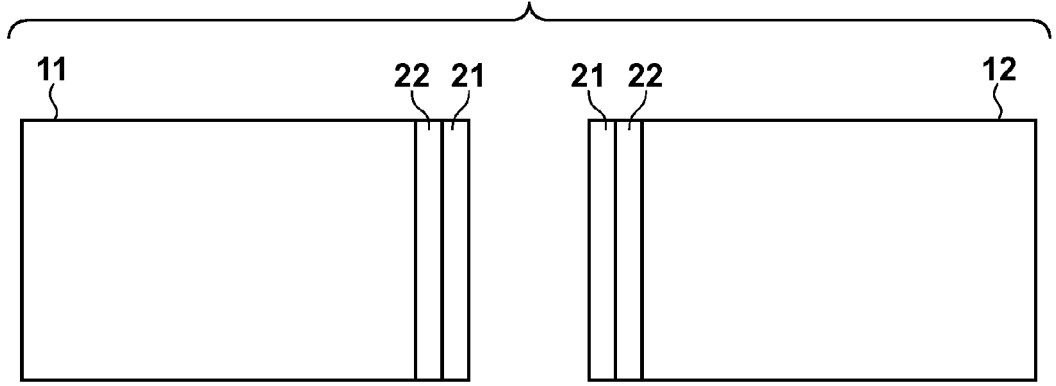
FIGS. 2A and 2B are views for explaining a multi-projection system according to the first embodiment.
Figure 2B:
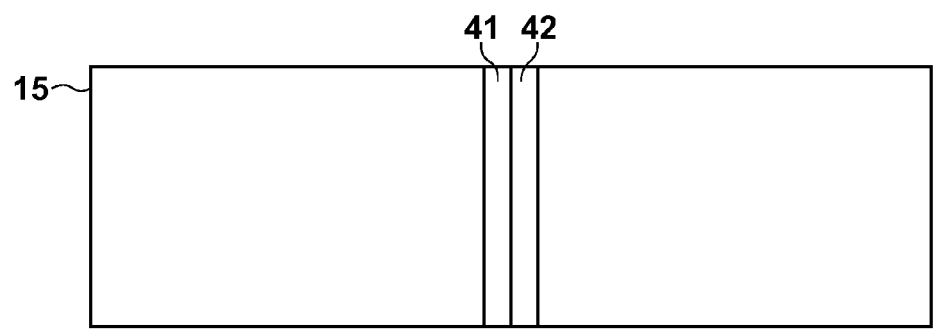

The first embodiment will be described with reference to FIGS. 2A to 3B. FIGS. 2A and 2B are views for explaining a multi-projection system using a plurality of image display apparatuses according to this embodiment. FIGS. 3A and 3B are views for explaining how units of lighting are set in the embodiment. The multi-projection system according to the embodiment forms an image longer in the horizontal direction by mutually combining the projection images respectively projected by two image display apparatuses in the horizontal direction. A first projection image 11 and a second projection image 12 shown in FIG. 2A are projection images before combining. The multi-projection system according to the embodiment projects a projection image 15 after combining, which is shown in FIG. 2B, by mutually combining the first projection image 11 and the second projection image 12.

As shown in FIG. 2A, the image display apparatuses according to this embodiment arrange parts for overlapping used for combining projection images on the first projection image 11 and the second projection image 12. The image display apparatuses arrange a part 21 for overlapping and a part 22 for overlapping on the first projection image 11 sequentially from the right end of the projection image, and a part 21 for overlapping and a part 22 for overlapping on the second projection image 12 sequentially from the left end of the projection image. Assume that in the embodiment, the width of the part 21 for overlapping and part 22 for overlapping is the width by which one point light source 1 on the light source 2 according to the embodiment projects light. If, for example, one point light source 1 projects an image of 10 pixels×10 pixels, the width of the part 21 for overlapping and part 22 for overlapping is 10 pixels. Note that the above values are exemplary and not exhaustive.

As shown in FIG. 2B, the multi-projection system according to this embodiment forms the projection image 15 after combining the first projection image 11 and the second projection image 12. In this case, the multi-projection system according to the embodiment forms an overlapped area 41 and an overlapped area 42 on the projection image 15. A method of forming the overlapped area 41 and the overlapped area 42 will be described below.

1) Overlapped Area 41
   overlapping part 22 for overlapping of first projection image 11 and part 21 for overlapping of second projection image 12

2) Overlapped Area 42
   overlapping part 21 for overlapping of first projection image 11 and part 22 for overlapping of second projection image 12

As described above, the overlapped area 41 and the overlapped area 42 are formed by overlapping the parts 21 for overlapping and the parts 22 for overlapping. For this purpose, the image display apparatuses according to this embodiment need to arrange the parts 21 for overlapping and the parts 22 for overlapping so as to make them have the same shape.

The setting of units of lighting in this embodiment will be described next with reference to FIGS. 3A and 3B. FIG. 3A shows the light source 2 which projects the first projection image 11. FIG. 3B shows the light source 2 which projects the second projection image 12. The image display apparatus according to the embodiment arranges, on the light source 2 which projects the first projection image 11, a unit 101 of lighting for projecting the part 21 for overlapping and a unit 102 of lighting for projecting the part 22 for overlapping. Likewise, the image display apparatus according to the embodiment arranges, on the light source 2 which projects the second projection image 12, a unit 101 of lighting which is located on the outer side and projects the part 21 for overlapping and a unit 102 of lighting which is located on the inner side and projects the part 22 for overlapping. In the embodiment, since the width of the part 21 for overlapping and part 22 for overlapping is the width by which one point light source 1 on the light source 2 projects light, the width of the unit 101 of lighting and unit 102 of lighting is equal to the width of the point light source 1.

The following will describe a procedure of suppressing the misadjusted black level in each overlapped area, that is, controlling the luminance in each overlapped area to a luminance equal to or less than that in areas other than the overlapped areas, in the projection image after combining shown in FIGS. 2A and 2B. Assume that in this case, the black level, that is, the luminance of a projection image depending on an image with a luminance signal of 0, is the same in both the first projection image 11 and the second projection image 12, and is represented by BL. In addition, assume that the following ratios are values when the ratio in an overlapped area to which the misadjusted black level suppression means is not applied is 100%.

First of all, the image display apparatus according to this embodiment sets the maximum radiant light beams in the unit 101 of lighting and the unit 102 of lighting to the following values, and suppresses a radiant light beam from the point light source 1 included in each unit of lighting. Note that the following set values are exemplary and not exhaustive.

a) unit 101 of lighting: 20%
b) unit 102 of lighting: 80%

Assume that the ratio of a radiant light beam in each area other than the unit 101 of lighting or the unit 102 of lighting is 100%.

The unit 101 of lighting projects the part 21 for overlapping, and the unit 102 of lighting projects the part 22 for overlapping. Consequently, the ratios of radiant light beams in the part 21 for overlapping and the part 22 for overlapping and the ratio of a radiant light beam in each remaining area have the following values:

a) part 21 for overlapping: 20%
b) part 22 for overlapping: 80%
c) remaining area: 100%

Therefore, the ratio of radiant light beams in the overlapped area 41 or overlapped area 42 where the part 21 for overlapping and the part 22 for overlapping overlap becomes the following value:

a) Overlapped Area 41
   part 22 for overlapping of first projection image 11 (80%)+part 21 for overlapping of second projection image 12 (20%)=100% b) Overlapped Area 42
   part 21 for overlapping of first projection image 11 (20%)+part 22 for overlapping of second projection image 12 (80%)=100%

That is, the ratios of radiant light beams in both the overlapped area 41 and the overlapped area 42 are 100%. Furthermore, since the ratio of a radiant light beam in each area other than the part 21 for overlapping and the part 22 for overlapping is 100%, the ratio of a radiant light beam throughout the entire projection image 15 after combining is 100%. Therefore, in the multi-projection system according to this embodiment, since the luminance in an overlapped area of a projection image is equal to that in each remaining area, no contrast inconsistency is caused by overlapping of projection images in the projection image.

On the other hand, the black levels in the overlapped area 41 and the overlapped area 42 have the following values:

a) Overlapped Area 41
   BL×radiant light beam in part 22 for overlapping of first projection image 11 (80%)+BL×radiant light beam in part 21 for overlapping of second projection image 12 (20%)=BL b) Overlapped Area 42
   BL×radiant light beam in part 21 for overlapping of first projection image 11 (20%)+BL×radiant light beam in part 22 for overlapping of second projection image 12 (80%)=BL That is, the black levels in both the overlapped area 41 and the overlapped area 42 are BL. In addition, since the black level in each area other than the overlapped areas, that is, each area other than the part 21 for overlapping and the part 22 for overlapping, remains BL, the black levels throughout the entire projection image 15 after combining are equalized into BL. Therefore, in the multi-projection system according to this embodiment, the misadjusted black level in each overlapped area of a projection image is never prominent. Although the embodiment has exemplified the case in which projection images are mutually combined in the horizontal direction, projection images may be mutually combined in the vertical direction.

Second Embodiment

Figure 6A:
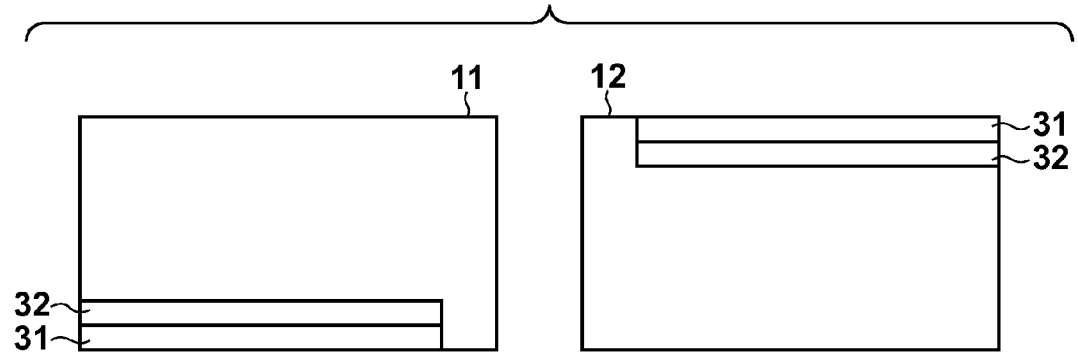
FIGS. 6A and 6B are views for explaining a multi-projection system according to the third embodiment.
Figure 6B:
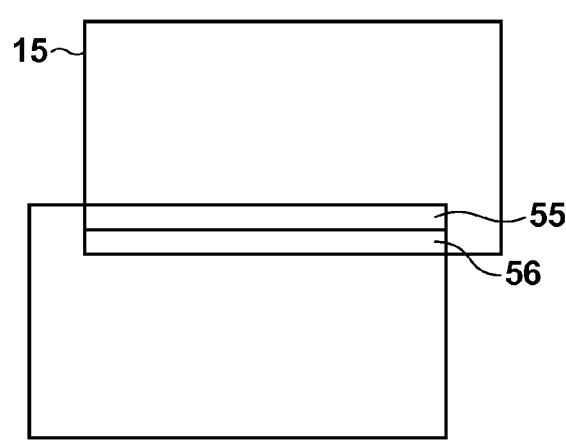

The second embodiment will be described next with reference to FIGS. 4A to 4E and 5A to 5D. FIGS. 4A to 4E are views for explaining a multi-projection system according to this embodiment. FIGS. 5A to 5D are views for explaining how units of lighting are set in the embodiment. The multi-projection system according to the embodiment forms a large image by mutually combining the projection images respectively projected by four image display apparatuses. More specifically, in the embodiment, a first projection image 11, a second projection image 12, a third projection image 13, and a fourth projection image 14 are mutually combined in the horizontal and vertical directions. The first to fourth projection images 11 to 14 respectively shown in FIGS. 4A to 4D are projection images before combining. The multi-projection system according to the embodiment projects a projection image 15 after combining, which is shown in FIG. 6B, by mutually combining the first to fourth projection images 11 to 14 in the horizontal and vertical directions.

As shown in FIG. 4A, the image display apparatus according to this embodiment sets parts for overlapping to be used for combining projection images on the first projection image 11. A part 23 for overlapping and a part 24 for overlapping are used for combining in the horizontal direction, that is, combining with the second projection image 12. A part 25 for overlapping and a part 26 for overlapping are used for combining in the vertical direction, that is, combining with the third projection image 13. In addition, a part 27 for overlapping, a part 28 for overlapping, a part 29 for overlapping, and a part 30 for overlapping are used to combine the areas where four frames, that is, the first to fourth projection images 11 to 14, overlap each other.

Likewise, as shown in FIGS. 4B to 4D, the image display apparatuses according to this embodiment set parts for overlapping used to combine projection images on the second to fourth projection images 12 to 14. Assume that in the embodiment, the width (lateral width) of the parts 23 and 24 for overlapping is the width by which one point light source 1 on the light source 2 according to the embodiment projects light. Assume also that the height (longitudinal width) of the parts 25 and 26 for overlapping is the height by which one point light source 1 on the light source 2 according to the embodiment projects light. In addition, assume that the parts 27 to 30 for overlapping are areas projected by one point light source 1. If, for example, one point light source 1 projects an image of 10 pixels×10 pixels as in the first embodiment, the width of the part 23 for overlapping and part 24 for overlapping is 10 pixels, and the height of the part 25 for overlapping and part 26 for overlapping is 10 pixels. In addition, the parts 27 to 30 for overlapping occupy an area of 10 pixels×10 pixels. Note that the above values are exemplary and not exhaustive. Table 1 shows targets to overlap with the parts 23 to 30 for overlapping according to this embodiment.

TABLE 1

| Part for Overlapping | Target to Overlap | Shape |
|---|---|---|
| part 23 for overlapping | two frames in horizontal direction | lateral width is width by which one point light source projects light |
| part 24 for overlapping | two frames in horizontal direction | lateral width is width by which one point light source projects light |
| part 25 for overlapping | two frames in vertical direction | longitudinal width is width by which one point light source projects light |
| part 26 for overlapping | two frames in vertical direction | longitudinal width is width by which one point light source projects light |
| part 27 for overlapping | four frames | area projected by one point light source |
| part 28 for overlapping | four frames | area projected by one point light source |
| part 29 for overlapping | four frames | area projected by one point light source |
| part 30 for overlapping | four frames | area projected by one point light source |

FIG. 4E shows the projection image 15 after the multi-projection system according to this embodiment combines the first to fourth projection images 11 to 14. As shown in FIG. 4E, 12 overlapped areas from an overlapped area 43 to an overlapped area 54 are formed on the projection image 15 after combining. Table 2 shows the specifications of each overlapped area formed on the projection image 15 after combining. As shown in Table 2, the overlapped areas 43, 44, 47, and 48 are formed by overlapping the parts 23 for overlapping and the parts 24 for overlapping. Therefore, the image display apparatuses according to this embodiment need to arrange the parts 23 for overlapping and the parts 24 for overlapping so as to make them have the same shape. Likewise, the image display apparatuses according to the embodiment need to arrange the parts 25 for overlapping and the parts 26 for overlapping so as to make them have the same shape. In addition, the image display apparatuses according to the embodiment need to arrange the four parts 27 to 30 for overlapping so as to make them have the same shape.

TABLE 2

| | Constituent Elements | |
|---|---|---|
| Overlapped Area | Projection Image | Part for Overlapping |
| overlapped area 43 | first projection image 11 | part 24 for overlapping |
| | second projection image 12 | part 23 for overlapping |
| overlapped area 44 | first projection image 11 | part 23 for overlapping |
| | second projection image 12 | part 24 for overlapping |
| overlapped area 45 | first projection image 11 | part 26 for overlapping |
| | third projection image 13 | part 25 for overlapping |
| overlapped area 46 | first projection image 11 | part 25 for overlapping |
| | third projection image 13 | part 26 for overlapping |
| overlapped area 47 | third projection image 13 | part 24 for overlapping |
| | fourth projection image 14 | part 23 for overlapping |
| overlapped area 48 | third projection image 13 | part 23 for overlapping |
| | fourth projection image 14 | part 24 for overlapping |
| overlapped area 49 | second projection image 12 | part 26 for overlapping |
| | fourth projection image 14 | part 25 for overlapping |
| overlapped area 50 | second projection image 12 | part 25 for overlapping |
| | fourth projection image 14 | part 26 for overlapping |
| overlapped area 51 | first projection image 11 | part 30 for overlapping |
| | second projection image 12 | part 28 for overlapping |
| | third projection image 13 | part 29 for overlapping |
| | fourth projection image 14 | part 27 for overlapping |
| overlapped area 52 | first projection image 11 | part 28 for overlapping |
| | second projection image 12 | part 30 for overlapping |
| | third projection image 13 | part 27 for overlapping |
| | fourth projection image 14 | part 29 for overlapping |
| overlapped area 53 | first projection image 11 | part 29 for overlapping |
| | second projection image 12 | part 27 for overlapping |
| | third projection image 13 | part 30 for overlapping |
| | fourth projection image 14 | part 28 for overlapping |
| overlapped area 54 | first projection image 11 | part 27 for overlapping |
| | second projection image 12 | part 29 for overlapping |
| | third projection image 13 | part 28 for overlapping |
| | fourth projection image 14 | part 30 for overlapping |

A method of setting units of lighting according to this embodiment will be described next with reference to FIGS.

5A to 5D. FIG. 5A shows the light source 2 which projects the first projection image 11. FIG. 5B shows the light source 2 which projects the second projection image 12. FIG. 5C shows the light source 2 which projects the third projection image 13. FIG. 5D shows the light source 2 which projects the fourth projection image 14. Units of lighting which project the eight parts for overlapping from the parts 23 to 30 for overlapping are set on each light source 2. Table 3 shows each unit of lighting, each part for overlapping to be projected, each shape, and each maximum radiant light beam. The maximum radiant light beams in Table 3 are exemplary set values set when the misadjusted black level suppression means for overlapped areas according to this embodiment is applied.

TABLE 3

| Unit of Lighting | Part for Overlapping to Be Projected | Shape | Maximum Radiant Light Beam (%) |
|---|---|---|---|
| unit 103 of lighting | part 23 for overlapping | one point light source width | 20 |
| unit 104 of lighting | part 24 for overlapping | one point light source width | 80 |
| unit 105 of lighting | part 25 for overlapping | one point light source height | 20 |
| unit 106 of lighting | part 26 for overlapping | one point light source height | 80 |
| unit 107 of lighting | part 27 for overlapping | one point light source | 4 |
| unit 108 of lighting | part 28 for overlapping | one point light source | 16 |
| unit 109 of lighting | part 29 for overlapping | one point light source | 16 |
| unit 110 of lighting | part 30 for overlapping | one point light source | 64 |

A procedure of suppressing the misadjusted black level in each overlapped area in the multi-projection system shown in FIG. 4 will be described next. The black level is the same in each of the first to fourth projection images 11 to 14, and the value of this level is represented by BL, as in the first embodiment. The image display apparatus according to the second embodiment respectively sets radiant light beams in units 103 to 110 of lighting, as in the first embodiment. Assume that Table 3 shows the set values. The image display apparatus according to the second embodiment controls radiant light beams from the point light sources 1 included in the units 103 to 110 of lighting so as to emit the light beams set in the respective units of lighting. In addition, assume that the ratio of a radiant light beam in each area other than the units 103 to 110 of lighting is 100%. Note that the set values written in Table 3 are exemplary and not exhaustive.

Table 4 shows the values of radiant light beams and black levels in the overlapped areas 41 to 54 when the radiant light beams in the respective parts for overlapping are suppressed to the radiant light beams written in Table 3. As shown in Table 4, the ratios of the radiant light beams in the overlapped areas 41 to 54 are 100%. In addition, since the ratio of the radiant light beam in each area other than the units 103 to 110 of lighting is 100%, the ratio of the radiant light beam in each area other than overlapped areas 41 to 54 is 100%. Consequently, the ratio of a radiant light beam throughout the entire projection image 15 after combining is 100%. Therefore, in the multi-projection system according to this embodiment, since the luminance in each overlapped area of a projection image is equal to that in each remaining area, no contrast inconsistency is caused by overlapping of projection images in the projection image.

TABLE 4

| | | | Constituent Elements | |
|---|---|---|---|---|
| Overlapped Area | Radiant Light Beam | Black Level | Projection Image | Part for Overlapping |
| overlapped area 43 | 80% + 20% = 100% | 80% × BL + 20% × BL = BL | first projection image 11<br>second projection image 12 | part 24 for overlapping<br>part 23 for overlapping |
| overlapped area 44 | 20% + 80% = 100% | 20% × BL + 80% × BL = BL | first projection image 11<br>second projection image 12 | part 23 for overlapping<br>part 24 for overlapping |
| overlapped area 45 | 80% + 20% = 100% | 80% × BL + 20% × BL = BL | first projection image 11<br>third projection image 13 | part 26 for overlapping<br>part 25 for overlapping |
| overlapped area 46 | 20% + 80% = 100% | 20% × BL + 80% × BL = BL | first projection image 11<br>third projection image 13 | part 25 for overlapping<br>part 26 for overlapping |
| overlapped area 47 | 80% + 20% = 100% | 80% × BL + 20% × BL = BL | third projection image 13<br>fourth projection image 14 | part 24 for overlapping<br>part 23 for overlapping |
| overlapped area 48 | 20% + 80% = 100% | 20% × BL + 80% × BL = BL | third projection image 13<br>fourth projection image 14 | part 23 for overlapping<br>part 24 for overlapping |
| overlapped area 49 | 80% + 20% = 100% | 80% × BL + 20% × BL = BL | second projection image 12<br>fourth projection image 14 | part 26 for overlapping<br>part 25 for overlapping |
| overlapped area 50 | 20% + 80% = 100% | 20% × BL + 80% × BL = BL | second projection image 12<br>fourth projection image 14 | part 25 for overlapping<br>part 26 for overlapping |
| overlapped area 51 | 64% + 16% + 16% + 4% = 100% | 64% × BL + 16% × BL + 16% × BL + 4% × BL = BL | first projection image 11<br>second projection image 12<br>third projection image 13<br>fourth projection image 14 | part 30 for overlapping<br>part 28 for overlapping<br>part 29 for overlapping<br>part 27 for overlapping |
| overlapped area 52 | 16% + 64% + 4% + 16% = 100% | 16% × BL + 64% × BL + 4% × BL + 16% × BL = BL | first projection image 11<br>second projection image 12<br>third projection image 13<br>fourth projection image 14 | part 28 for overlapping<br>part 30 for overlapping<br>part 27 for overlapping<br>part 29 for overlapping |
| overlapped area 53 | 16% + 4% + 64% + 16% = 100% | 16% × BL + 4% × BL + 64% × BL + 16% × BL = BL | first projection image 11<br>second projection image 12<br>third projection image 13<br>fourth projection image 14 | part 29 for overlapping<br>part 27 for overlapping<br>part 30 for overlapping<br>part 28 for overlapping |

TABLE 4-continued

| Overlapped Area | Radiant Light Beam | Black Level | Constituent Elements | |
|---|---|---|---|---|
| | | | Projection Image | Part for Overlapping |
| overlapped area 54 | 4% + 16% + 16% + 64% = 100% | 4% × BL + 16% × BL + 16% × BL + 64% × BL = BL | first projection image 11<br>second projection image 12<br>third projection image 13<br>fourth projection image 14 | part 27 for overlapping<br>part 29 for overlapping<br>part 28 for overlapping<br>part 30 for overlapping |

As shown in Table 4, the black levels in the overlapped areas 41 to 54 are equalized into BL. As in the first embodiment, since the black level in each area other than the overlapped areas, that is, each area other than the parts 23 to 30 for overlapping, remains BL, the black levels throughout the entire projection image 15 after combining are equalized into BL. Therefore, in the multi-projection system according to this embodiment, the misadjusted black level in each overlapped area of a projection image is never prominent.

Third Embodiment

Figure 7A:
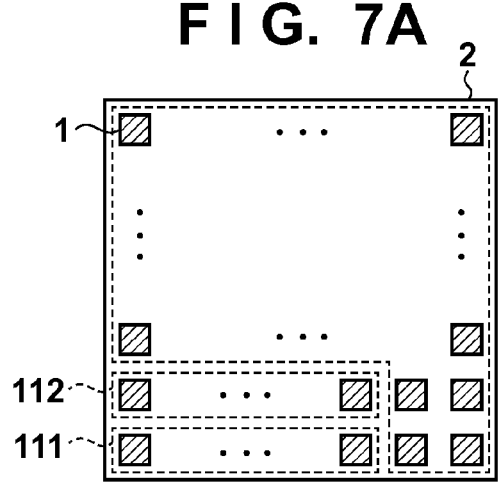
FIGS. 7A and 7B are views for explaining how units of lighting are set in the third embodiment.
Figure 7B:
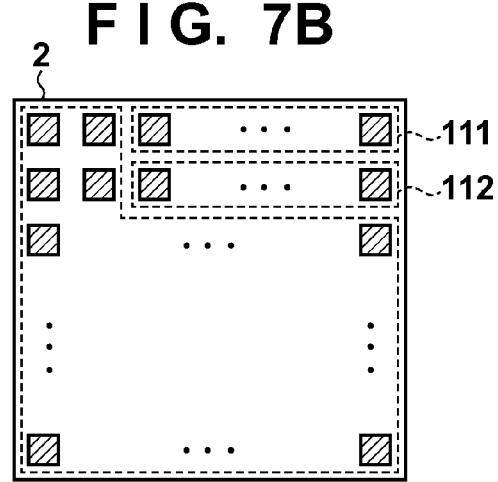

The third embodiment will be subsequently described with reference to FIGS. 6A to 7B. FIGS. 6A and 6B are views for explaining a multi-projection system according to this embodiment. FIGS. 7A and 7B are views for explaining how units of lighting are set in the embodiment. The multi-projection system according to the embodiment forms a large image by partially and mutually combining the projection images respectively projected by two image display apparatuses. More specifically, a first projection image 11 and a second projection image 12 are partially and mutually combined in the vertical direction. The first projection image 11 and the second projection image 12 shown in FIG. 6A are projection images before combining. The multi-projection system according to the embodiment mutually combines the first projection image 11 and the second projection image 12 with a shift in the horizontal direction, and projects a projection image 15 after combining, which is shown in FIG. 6B.

As shown in FIG. 6A, the image display apparatus according to this embodiment arranges parts for overlapping used to combine projection images on the first projection image 11 and the second projection image 12. The image display apparatuses according to this embodiment arrange a part 31 for overlapping and a part 32 for overlapping on the first projection image 11 sequentially from the lower end of the projection image, and a part 31 for overlapping and a part 32 for overlapping on the second projection image 12 sequentially from the upper end of the projection image. Assume that in the embodiment, the height (longitudinal width) of the part 31 for overlapping and part 32 for overlapping is the height by which one point light source 1 on the light source 2 according to the embodiment projects light. If, for example, one point light source 1 projects an image of 10 pixels×10 pixels, the width of the part 31 for overlapping and part 32 for overlapping is 10 pixels.

In addition, the lateral width of the part 31 for overlapping and part 32 for overlapping is shorter than that of the first projection image 11 or second projection image 12 by the shift in the horizontal direction at the time of combining. Assume that in this embodiment, the shift in the horizontal direction is an integer multiple, e.g., twice, of the width of an image projected by the point light source 1. In the embodiment, since one point light source 1 projects an image of 10 pixels×10 pixels, the shift amount in the horizontal direction is 2×10 pixels=20 pixels. Therefore, the width of the part 31 for overlapping and part 32 for overlapping is shorter than the width of the first projection image 11 or the second projection image 12 by 20 pixels. Note that the above values are exemplary and not exhaustive.

As shown in FIG. 6B, an overlapped area 55 and an overlapped area 56 are formed on the projection image 15 after combining the first projection image 11 and the second projection image 12. The following is a method of forming the overlapped area 55 and the overlapped area 56.
1) Overlapped Area 55
   overlapping part 32 for overlapping of first projection image 11 and part 31 for overlapping of second projection image 12
2) Overlapped Area 56
   overlapping part 31 for overlapping of first projection image 11 and part 32 for overlapping of second projection image 12

As described above, the overlapped area 55 and the overlapped area 56 are formed by overlapping the parts 31 for overlapping and the parts 32 for overlapping. For this purpose, the image display apparatuses according to this embodiment need to set the parts 31 for overlapping and the parts 32 for overlapping so as to make them have the same shape.

The setting of units of lighting in this embodiment will be described next with reference to FIGS. 7A and 7B. FIG. 7A shows the light source 2 which projects the first projection image 11. FIG. 7B shows the light source 2 which projects the second projection image 12. The image display apparatus according to the embodiment arranges a unit 111 of lighting for projecting the part 31 for overlapping and a unit 112 of lighting for projecting the part 32 for overlapping on the light source 2 which projects the first projection image 11. Likewise, the image display apparatus according to the embodiment arranges a unit 111 of lighting for projecting the part 31 for overlapping and a unit 112 of lighting for projecting the part 32 for overlapping on the light source 2 which projects the second projection image 12. In the embodiment, since the height of the part 31 for overlapping and part 32 for overlapping is the height by which one point light source 1 on the light source 2 projects light, the width of the unit 111 of lighting and unit 112 of lighting is equal to the width of the point light source 1. Note however that since the first projection image 11 and the second projection image 12 are combined with a shift corresponding to 20 pixels in the horizontal direction, that is, a width by which two point light sources 1 project light, the width of the unit 111 of lighting and unit 112 of lighting is shorter by two point light sources 1.

The following will describe a procedure of suppressing the misadjusted black level in each overlapped area of a projection image in the multi-projection system according to this embodiment. Assume that in this case, as in the first embodiment, the black levels in both the first projection image 11 and the second projection image 12 are BL, and the following ratios are values when the ratio in an overlapped area to which the misadjusted black level suppression means according to this embodiment is not applied is 100%. In addition, the maximum radiant light beams in the unit 111 of lighting and the unit 112 of lighting are set to the following values. Note that the following set values are exemplary and not exhaustive. Assume that the ratio of a radiant light beam in each area other than the unit 111 of lighting and the unit 112 of lighting is 100%.

a) unit 111 of lighting: 20%
b) unit 112 of lighting: 80%

As in the first embodiment, the unit 111 of lighting projects the part 31 for overlapping, and the unit 112 of lighting projects the part 32 for overlapping. Consequently, the ratios of radiant light beams in the part 31 for overlapping and the part 32 for overlapping and the ratio of a radiant light beam in each remaining area have the following values:

a) part 31 for overlapping: 20%
b) part 32 for overlapping: 80%
c) remaining area: 100%

Therefore, the ratio of radiant light beams in the overlapped area 55 or overlapped area 56 where the part 31 for overlapping and the part 32 for overlapping overlap becomes the following value:

a) Overlapped Area 55
  part 32 for overlapping of first projection image 11 (80%)+part 31 for overlapping of second projection image 12 (20%)=100%
b) Overlapped Area 56
  part 31 for overlapping of first projection image 11 (20%)+part 32 for overlapping of second projection image 12 (80%)=100%

That is, the ratios of radiant light beams in both the overlapped area 55 and the overlapped area 56 are 100%. Furthermore, the ratio of a radiant light beam in each area other than the overlapped areas, that is, each area other than the part 31 for overlapping and the part 32 for overlapping, is 100%. Consequently, the ratio of a radiant light beam throughout the entire projection image 15 after combining is 100%. Therefore, in the multi-projection system according to this embodiment, since the luminance in an overlapped area of a projection image is equal to that in the remaining area, no contrast inconsistency is caused by overlapping of projection images in the projection image.

As in the first embodiment, the black levels in the overlapped area 55 and the overlapped area 56 have the following values:

a) Overlapped Area 55
  BL×radiant light beam in part 32 for overlapping of first projection image 11 (80%)+BL×radiant light beam in part 31 for overlapping of second projection image 12 (20%)=BL
b) Overlapped Area 56
  BL×radiant light beam in part 31 for overlapping of first projection image 11 (20%)+BL×radiant light beam in part 32 for overlapping of second projection image 12 (80%)=BL That is, the black levels in both the overlapped area 55 and the overlapped area 56 are BL. In addition, since the black level in an area other than the overlapped areas, that is, an area other than the part 31 for overlapping and the part 32 for overlapping, remains BL, the black levels throughout the entire projection image 15 after combining are equalized into BL. Therefore, in the multi-projection system according to this embodiment, the misadjusted black level in an overlapped area of a projection image is never prominent. Although the embodiment has exemplified the case in which projection images are mutually combined in the horizontal direction, projection images may be mutually combined in the vertical direction.

Fourth Embodiment

The fourth embodiment will be subsequently described with reference to FIGS. 8A, 8B, 9A, 9B, 10A, and 10B. FIGS. 8A and 8B are views for explaining the influence of leaked light in a reflective liquid crystal display element. FIGS. 9A and 9B are views for explaining a multi-projection system according to this embodiment. FIGS. 10A and 10B are views for explaining how units of lighting are set in this embodiment. The embodiment will exemplify a case in which a multi-projection system is constructed by applying a reflective liquid crystal display element to a display element of an image display apparatus. The multi-projection system according to the embodiment projects an image longer in the horizontal direction by mutually combining projection images of two frames in the horizontal direction.

The influence of leaked light in a reflective liquid crystal display element will be described first with reference to FIGS. 8A and 8B. Each reflective liquid crystal display element forms a projection image by modulating light from a light source. Part of the light source light entering the reflective liquid crystal display element is reflected by members in the reflective liquid crystal display element and leaks around the reflective liquid crystal display element. FIG. 8A shows an example of leaked light 71 leaking around a first projection image 11 and leaked light 72 leaking around second projection image 12. The shapes of the leaked light 71 and leaked light 72 depend on the characteristics of a reflective liquid crystal display element which projects an image.

FIG. 8B shows a projection image 15 after combining which is obtained by combining the first projection image 11 accompanied by the leaked light 71 and the second projection image 12 accompanied by the leaked light 72. Note that FIG. 8B shows only the leaked light 71 and the leaked light 72 existing on the projection image 15 after combining but does not show the leaked light 71 and the leaked light 72 existing around the projection image 15 after combining. As shown in FIG. 8B, the leaked light 71 exists adjacent to an overlapped area 42, and the leaked light 72 exists adjacent to an overlapped area 41. Therefore, the leaked light 71 overlaps an area other than the part for overlapping on the second projection image 12. On the other hand, the leaked light 72 overlaps an area other than the part for overlapping on the first projection image 11.

Assume that in this case, the influence of leaked light on a reflective liquid crystal display element is represented by LL %. The area which the leaked light 71 overlaps includes a radiant light beam originating from the leaked light 71 in addition to a radiant light beam emitted from the second projection image 12. Since the area of the second projection image 12 which the leaked light 71 overlaps is not a part for overlapping, the ratio of a radiant light beam emitted from the area is 100%. Therefore, the ratio of a radiant light beam in the area which the leaked light 71 overlaps is (100+LL) %. Likewise, the ratio of a radiant light beam in the area which the leaked light 72 overlaps is (100+LL) %. As in the first embodiment, the ratios of radiant light beams in the overlapped area 41 and the overlapped area 42 are 100%. In addition, the ratio of a radiant light beam in each area other than the area which the leaked light 71 or leaked light 72 overlaps is also 100%. However, the ratio of a radiant light beam in the area which the leaked light 71 or leaked light 72 overlaps is (100+LL) %, which is higher than that in the remaining areas.

A means for suppressing the influence of leaked light according to this embodiment will be subsequently described. The first projection image 11 or second projection image 12 shown in FIG. 9A is a projection image before combining. The multi-projection system according to the embodiment projects the projection image 15 after combining which is shown in FIG. 9B, by combining the first projection image 11 and the second projection image 12. As shown in FIG. 8A, the image display apparatuses according to the embodiment arrange parts for overlapping used to combine projection images on the first projection image 11 and the second projection image 12. The image display apparatuses according to the embodiment arrange the part 21 for overlapping and the part 22 for overlapping on the first projection image 11 sequentially from the right end of the projection image, and the part 21 for overlapping and the part 22 for overlapping on the second projection image 12 sequentially from the left end of the projection image. As in the first embodiment, the width of the part 21 for overlapping and part 22 for overlapping is the width by which one point light source 1 on the light source 2 according to the embodiment projects light. If, for example, one point light source 1 projects an image of 10 pixels×10 pixels, the width of the part 21 for overlapping and part 22 for overlapping is 10 pixels.

Unlike in the first embodiment, the image display apparatus according to the fourth embodiment arranges a leaked light suppression area 61 adjacent to the part 22 for overlapping of the projection image so as to locate the leaked light suppression area 61 inside the part 22 for overlapping. The leaked light suppression area 61 is not used to combine the first projection image 11 and the second projection image 12. Assume that the leaked light suppression area 61 has a width that covers the range in which leaked light exists, with the width by which one point light source 1 on the light source 2 according to the embodiment projects light being a unit. For example, if one point light source 1 projects an image of 10 pixels×10 pixels and leaked light exists in the range of seven pixels from an end of the reflective liquid crystal display element, the width of the leaked light suppression area 61 is 10 pixels. In addition, if the range in which leaked light exists is 15 pixels, the width of the leaked light suppression area 61 is 20 pixels. Assume that in the embodiment, the width of the leaked light suppression area 61 is 10 pixels, which is equal to the lateral width of the part 21 for overlapping and part 22 for overlapping.

As shown in FIG. 9B, the overlapped area 41 and the overlapped area 42 are formed on the projection image 15 after combining the first projection image 11 and the second projection image 12. The method of forming the overlapped area 41 and the overlapped area 42 is the same as in the first embodiment, as shown below:
1) Overlapped Area 41
   overlapping part 22 for overlapping of first projection image 11 and part 21 for overlapping of second projection image 12
2) Overlapped Area 42
   overlapping part 21 for overlapping of first projection image 11 and part 22 for overlapping of second projection image 12

The leaked light suppression area 61 exists adjacent to the overlapped area 41 or the overlapped area 42 on the projection image 15 after combining without involving in the combining of the first projection image 11 and the second projection image 12.

A method of setting units of lighting in this embodiment will be described next with reference to FIGS. 10A and 10B. FIG. 10A shows the light source 2 which projects the first projection image 11. FIG. 10B shows the light source 2 which projects the second projection image 12. The image display apparatuses according to the embodiment respectively arrange units 101 of lighting for projecting the parts 21 for overlapping and units 102 of lighting for projecting the parts 22 for overlapping on the light source 2 which projects the first projection image 11 and the light source 2 which projects the second projection image 12, as in the first embodiment. In addition, the image display apparatus according to the embodiment arranges a unit 113 of lighting which projects the leaked light suppression area 61 so as to locate the unit of lighting adjacent to the unit 102 of lighting. In the embodiment, the lateral width of the part 21 for overlapping, part 22 for overlapping, and leaked light suppression area 61 is the width by which one point light source 1 on the light source 2 according to the embodiment projects light. Therefore, the width of the unit 101 of lighting, unit 102 of lighting, and unit 113 of lighting is equal to the width of the point light source 1.

A procedure of suppressing the influence of leaked light in the multi-projection system shown in FIGS. 9A and 9B will be subsequently described. In this embodiment, the degree of influence of leaked light on a reflective liquid crystal display element is represented by LL %. The value of LL depends on the characteristics of the reflective liquid crystal display element. In addition, assume that the values of the black levels in both the first projection image 11 and the second projection image 12 are BL. Assume also that the following ratios are values when the ratio in an overlapped area to which the misadjusted black level suppression means is not applied is 100%.

As in the first embodiment, the black levels in the overlapped area 41 and the overlapped area 42 have the following values:
a) Radiant Light Beam in Overlapped Area 41
   part 22 for overlapping of first projection image 11 (80%)+part 21 for overlapping of second projection image 12 (20%)=100%
b) Radiant Light Beam in Overlapped Area 42
   part 21 for overlapping of first projection image 11 (20%)+part 22 for overlapping of second projection image 12 (80%)=100%
c) Black Level in Overlapped Area 41
   BL×radiant light beam in part 22 for overlapping of first projection image 11 (80%)+BL×radiant light beam in part 21 for overlapping of second projection image 12 (20%)=BL
d) Black Level in Overlapped Area 42
   BL×radiant light beam in part 21 for overlapping of first projection image 11 (20%)+BL×radiant light beam in part 22 for overlapping of second projection image 12 (80%)=BL Assume that in this case, the maximum radiant light beam in the unit 113 of lighting is represented by (100−LL) %. Leaked light in the second projection image 12, that is, the leaked light 72, overlaps the leaked light suppression area 61 on the first projection image 11. In addition, leaked light in the first projection image 11, that is, the leaked light 71, overlaps the leaked light suppression area 61 on the second projection image 12. Therefore, the maximum radiant light beam in the leaked light suppression area 61 on the first projection image 11 and the maximum radiant light beam in the leaked light suppression area 61 on the second projection image 12 respectively have the following values:

a) Maximum Radiant Light Beam in Leaked Light Suppression Area 61 on First Projection Image 11
radiant light beam {(100−LL)}% in unit 113 of lighting+overlapping leaked light 72 (LL %)=100% b) Maximum Radiant Light Beam in Leaked Light Suppression Area 61 on Second Projection Image 12
radiant light beam {(100−LL)}% in unit 113 of lighting+overlapping leaked light 71 (LL %)=100%

In addition, the black levels in the respective leaked light suppression areas 61 have the following values:

a) Black Level in Leaked Light Suppression Area 61 on First Projection Image 11
BL×radiant light beam {(100−LL)}% in unit 113 of lighting+BL×overlapping leaked light 72 (LL %)=BL b) Black Level in Leaked Light Suppression Area 61 on Second Projection Image 12
BL×radiant light beam {(100−LL)}% in unit 113 of lighting+BL×overlapping leaked light 71 (LL %)=BL That is, the maximum radiant light beams and the black levels in the leaked light suppression area 61 on the first projection image 11 and the leaked light suppression area 61 on the second projection image 12 have the same values as those in the remaining areas, thereby suppressing the influence of leaked light. Therefore, the multi-projection system constituted by image display apparatuses using reflective liquid crystal display elements as in this embodiment is free from the influence of leaked light. Although the embodiment has exemplified the case in which projection images are mutually combined in the horizontal direction, projection images may be mutually combined in the vertical direction.

Fifth Embodiment

Figure 11A:
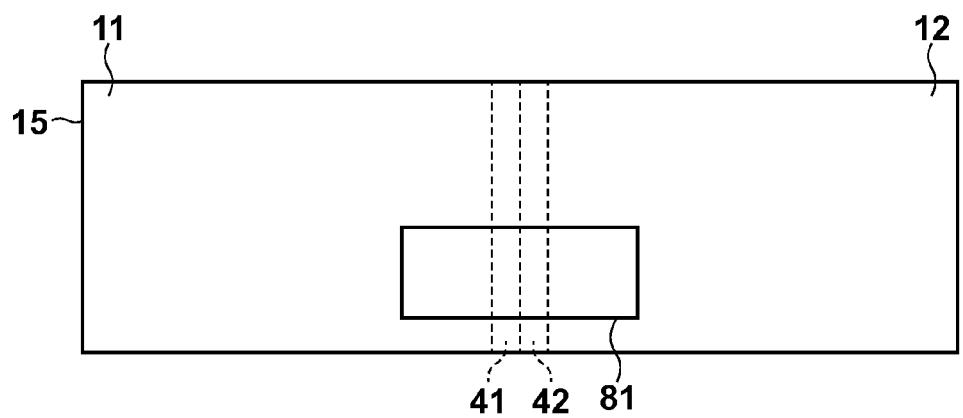
FIGS. 11A and 11B are views for explaining a multi-projection system according to the fifth embodiment.
Figure 11B:
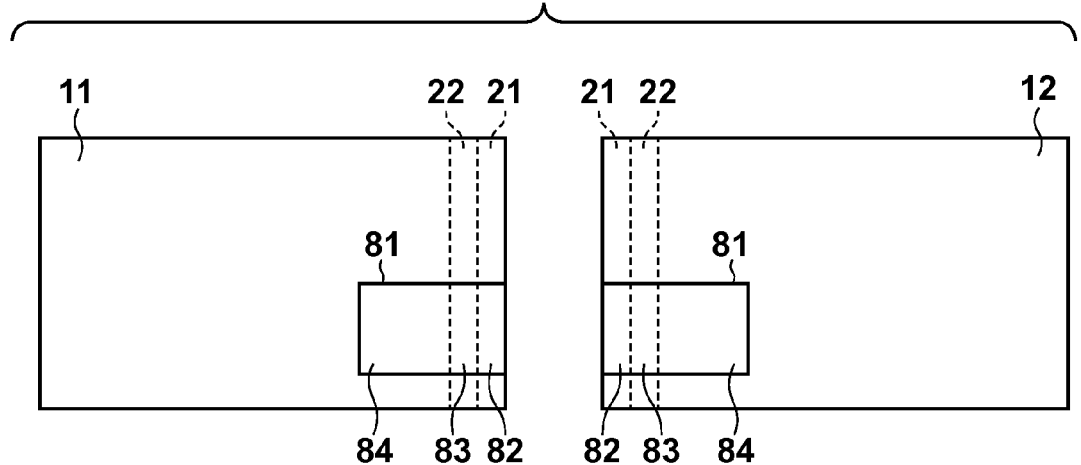

The fifth embodiment will be subsequently described with reference to FIGS. 11A and 11B. FIGS. 11A and 11B are views for explaining a multi-projection system according to this embodiment. The embodiment will exemplify a case in which a multi-projection system is constructed by using a plurality of image display apparatuses and adaptive lighting control. As in the first embodiment, the multi-projection system according to the fifth embodiment projects an image longer in the horizontal direction by mutually combining projection images of two frames in the horizontal direction. In addition, if the image display apparatus according to this embodiment needs to apply, to areas to which adaptive lighting control is executed, a different type of lighting control, the apparatus applies the respective types of lighting control. For example, when executing adaptive lighting control for an area to which lighting control aiming at suppression of a misadjusted black level in an overlapped area, that is, a part for overlapping, the image display apparatus according to the embodiment executes both lighting control for the part for overlapping and adaptive lighting control.

FIG. 11A shows a control target area 81 for which adaptive lighting control is executed on a projection image 15 after combining. The image display apparatus according to this embodiment executes adaptive lighting control for the control target area 81. As shown in FIG. 11A, the control target area 81 exists astride an overlapped area 41 and an overlapped area 42. FIG. 11B is a view showing the range in which the control target area 81 exists on a first projection image 11 or second projection image 12. In this case, the areas where the control target area 81 overlaps a part 21 for overlapping and a part 22 for overlapping are defined as follows:

a) Control Target Area 82
overlapped area between part 21 for overlapping and control target area 81 b) Control Target Area 83
overlapped area between part 22 for overlapping and control target area 81

In addition, the area where the control target area 81 does not overlap either the part 21 for overlapping or part 22 for overlapping will be referred to as a control target area 84.

The overlapped area 41 is the area where the part 22 for overlapping of the first projection image 11 overlaps the part 21 for overlapping of the second projection image 12. The overlapped area 42 is the area where the part 21 for overlapping of the first projection image 11 overlaps the part 22 for overlapping of the second projection image 12. Therefore, the overlapped areas among the overlapped area 41, the overlapped area 42, and the control target area 81 are the areas where the control target areas 82 and the control target areas 83 overlap.

Adaptive lighting control according to this embodiment will be subsequently described. Assume that the image display apparatus according to the embodiment limits a radiant light beam in the control target area 81, for which adaptive lighting control is executed, to 70%. If it is necessary to apply, to an area for which adaptive lighting control is executed, a different type of lighting control, the respective types of lighting control are applied to the area. Therefore, radiant light beams in the control target areas 82 to 84 have the following values:

a) Control Target Area 82
part 21 for overlapping (20%)×control target area 81 (70%)=14% b) Control Target Area 83
part 22 for overlapping (80%)×overlapped area of control target area 81 (70%)=56% c) Control Target Area 84
overlapped area of control target area 81 (70%)=70%

As described above, the overlapped area between the overlapped area 41 and the control target area 81 is the area where the control target area 82 and the control target area 83 overlap. In addition, the overlapped area between the overlapped area 42 and the control target area 81 is the area where the control target area 82 and the control target area 83 overlap. Therefore, radiant light beams in the overlapped areas among the overlapped area 41, the overlapped area 42, and the control target area 81 have the following values:

a) Radiant Light Beam in Overlapped Area Between Overlapped Area 41 and Control Target Area 81
control target area 82 (14%)+control target area 83 (56%)=70% b) Radiant Light Beam in Overlapped Area Between Overlapped Area 42 and Control Target Area 81
control target area 82 (14%)+control target area 83 (56%)=70%

In this case, the ratio of a radiant light beam in the area where the control target area 81 does not overlap either the part 21 for overlapping or part 22 for overlapping, that is, the control target area 84, is 70%. Consequently, the ratio of a radiant light beam throughout the entire control target area 81 on the projection image 15 after combining is 70%. Therefore, in the multi-projection system according to this embodiment, no contrast inconsistency occurs in the control target area 81.

The black level in the control target area 81 will be subsequently described. The black levels in the overlapped areas among the overlapped area 41, the overlapped area 42, and the control target area 81 have the following values:

a) Black Level in Overlapped Area Between Overlapped Area 41 and Control Target Area 81
BL×control target area 82 (14%)+BL×control target area 83 (56%)=0.7×BL b) Black Level in Overlapped Area Between
Overlapped Area 42 and Control Target Area 81 BL×control target area 82 (14%)+BL×control target area 83 (56%)=0.7×BL c) Black Level in Control Target Area 84
BL×control target area 84 (70%)=0.7×BL Consequently, the black level throughout the control target area 81 on the projection image 15 is 0.7×BL. Therefore, additionally using adaptive lighting control for the multi-projection system according to this embodiment will decrease the black level in the control target area 81 in accordance with limitations on a radiant light beam. In addition, no black level inconsistency occurs in the control target area 81. Although this embodiment has exemplified the case in which projection images are mutually combined in the horizontal direction, projection images may be mutually combined in the vertical direction.

According to the above embodiments, in the multi-projection system, it is possible to reduce the misadjusted black level in each overlapped area without causing any flickering or inconsistency in a projection image. In addition, according to the fourth embodiment, even when using reflective liquid crystal display elements as display elements, it is possible to suppress increases in luminance and misadjusted black level in the peripheral areas of overlapped areas. Furthermore, according to the fifth embodiment, even when additionally using adaptive lighting control for the multi-projection system, it is possible to suppress increases in luminance and misadjusted black level in the peripheral areas of overlapped areas. Therefore, the present invention can provide image display apparatuses suitable for the construction of a multi-projection system.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-263021, filed Dec. 19, 2013 which is hereby incorporated by reference herein in its entirety.

What is claimed is:

1. An image display apparatus comprising:
a projection unit comprising a plurality of point light sources, each of which emits light to project an image; and
a control unit configured to, in a case where a part of a first projection region projected by the projection unit and a part of a second projection region projected by another projection unit are overlapped with each other, control a maximum light intensity for each of the plurality of point light sources of the projection unit such that (a) a maximum light intensity for one or more point light sources used to project an image on an overlapped area within the first projection region is lower than (b) a maximum light intensity for one or more point light sources used to project an image on a non-overlapped area within the first projection region.

2. The apparatus according to claim 1, wherein said control unit suppresses a radiant light beam of a point light source used to project an image on the overlapped area within the first projection region.

3. The apparatus according to claim 2, wherein said control unit suppresses more a radiant light beam of a point light source used to project an image on a first overlapped area within the first projection area than that of a point light source used to project an image on a second overlapped area within the first projection area, and
wherein the first overlapped area is farther from a center of the first projection area than the second overlapped area.

4. The apparatus according to claim 1, wherein said control unit suppresses a radiant light beam of one or more point light sources so as to suppress the leaked light.

5. The apparatus according to claim 1, wherein the control unit controls a light intensity of the plurality of point light sources by a predetermined number of point light sources, and
wherein one of a longitudinal width and lateral width of an area based on the predetermined number of point light sources is equal to a corresponding one of a longitudinal width and lateral width of a point light source.

6. The apparatus according to claim 1, wherein the control unit controls a light intensity of the plurality of point light sources by a predetermined number of point light sources, and
wherein one of a longitudinal width and lateral width of an area based on the predetermined number of point light sources is equal to a corresponding one of a longitudinal width and lateral width of the first image.

7. The apparatus according to claim 1, wherein the control unit controls a light intensity of the plurality of point light sources by a predetermined number of point light sources, and wherein one of a longitudinal width and lateral width of an area based on the predetermined number of point light sources is shorter than a corresponding one of a longitudinal width and lateral width of the first image by an integer multiple of a corresponding one of a longitudinal width and lateral width of a point light source.

8. The apparatus according to claim 1, wherein said control unit further controls a light intensity for a point light source used to project an image on the non-overlapped area within the first projection region.

9. A multi-projection system comprising a plurality of image display apparatuses each defined in claim 1.

10. The apparatus according to claim 1, wherein the control unit is configured to group the plurality of point light sources into groups and to control a light intensity by each group.

11. A method of controlling an image display apparatus comprising a plurality of point light sources, each of which emits light to project an image, the method comprising:

in a case where a part of a first projection region projected by the image display apparatus and a part of a second projection region projected by another image display apparatus are overlapped with each other, controlling a maximum light intensity for each of the plurality of point light sources of the image display apparatus such that (a) a maximum light intensity for one or more point light sources used to project an image on an overlapped area within the first projection region is lower than (b) a maximum light intensity for a point light source used to project an image on a non-overlapped area within the first projection region.

12. A non-transitory computer-readable storage medium storing a computer program for controlling a computer to execute a method of controlling an image display apparatus comprising a plurality of point light sources, each of which emits light to project an image, the method comprising:

in a case where a part of a first projection region projected by the image display apparatus and a part of a second projection region projected by another image display apparatus are overlapped with each other, controlling a maximum light intensity for each of the plurality of point light sources of the image display apparatus such that (a) a maximum light intensity for one or more point light sources used to project an image on an overlapped area within the first projection region is lower than (b) a maximum light intensity for a point light source used to project an image on a non-overlapped area within the first projection region.

* * * * *